Figure 1:
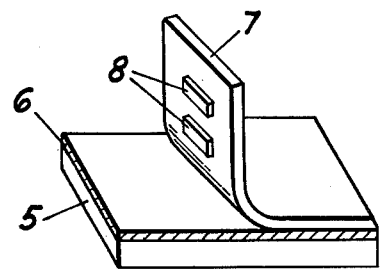

Oct. 3, 1961  H. A. CLARK  3,002,848
METHOD OF SELECTIVELY COATING SURFACES
Filed Feb. 4, 1960

INVENTOR.
HAROLD A. CLARK
BY Robert F. Fleming Jr.

United States Patent Office 3,002,848
Patented Oct. 3, 1961

3,002,848
METHOD OF SELECTIVELY COATING SURFACES
Harold A. Clark, Midland, Mich., assignor to Dow Corning Corporation, Midland, Mich., a corporation of Michigan
Filed Feb. 4, 1960, Ser. No. 6,690
2 Claims. (Cl. 117—10)

This invention relates to a method of selectively coating a surface with a silicone resin.

The problem of selectively coating certain areas of a surface can be accomplished by two general methods. One is the conventional printing technique, whereby the resinous coating is applied only to those areas which it is desired to coat. This method works perfectly well on flat surfaces and particularly when the area to be coated is small relative to the entire area of the surface. The second method is to apply a coating to the entire surface area and then by some means remove the coating from certain portions of the surface. This latter method is essential in those cases where the surface is of complicated shape or where the area to be coated comprises a majority of the total surface area. The problem becomes particularly acute in applications in which only an extremely small portion of the area is to be left uncoated.

In such cases when one attempts to use the first method, it is almost impossible to prevent contamination of the area which is not to be coated. Various methods may be employed for masking this area to prevent coating by the coating medium. However, it is not feasible, particularly when dealing with small devices, to mask the area with a solid material such as an adhesive tape, nor is it feasible to mask the area with a fluid or semifluid material which is incompatible with the coating resin. This is true because it is often impossible to completely remove the masking material from the uncoated area. This can often be undesirable or even fatal when it is desired to solder in the uncoated area.

For example, one may attempt to mask the uncoated area with a dimethylsiloxane and then coat the remaining area with an incompatible resin. However, in such cases it is often impractical to completely remove the dimethylpolysiloxane after the coating resin has been cured. This often prevents the formation of proper solder joints. The problem becomes particularly acute with miniature electronic devices where the uncoated area may be only a few miles in cross-section. In such cases the uncoated area must be both free of contamination and sharply defined.

It is the object of this invention to provide a method for selectively coating surfaces with organopolysiloxane resins which gives a sharp delineation between the coated and uncoated portions of the surface. Another object is to provide an improved method of preparing electronic equipment. Other objects and advantages will be apparent from the following description.

This invention relates to a method of selectively coating a surface with an organopolysiloxane resin which comprises (1) applying a coating of uncured siloxane resin to said surface, (2) placing a coating having an acid number of at least 1 and consisting essentially of a nonvolatile carboxylic acid against that portion of the siloxane resin coating which it is desired to remove from said surface, (3) heating the assembly at a temperature below the decomposition temperature of the carboxylic acid to cure that portion of the siloxane resin coating not in contact with said acid coating, and (4) removing the uncured siloxane resin and any adhering carboxylic acid coating from said surface with an alcohol solvent, whereby the cured siloxane film remains on the desired parts of said surface, said siloxane resin consisting essentially of a monovalent hydrocarbon substituted polysiloxane in which there is from 1 to 1.7 monovalent hydrocarbon radicals per silicon and a curing catalyst selected from the group quaternary ammonium salts of carboxylic acids, quaternary ammonium hydroxides and quaternary ammonium alkoxides.

In carrying out the method of this invention the organopolysiloxane resin can be applied to the surface by any convenient method, such as by brushing, dipping or spraying. If the resin is fluid enough, it can be applied to the surface per se, or the resin may be dissolved in suitable solvents for silicone resins. The concentration of the solution is not critical.

After the surface is coated with the siloxane resin, it is then best to allow the coating to air dry to remove the bulk of the solvent.

The non-volatile carboxylic acid coating is then applied to the selected portions of the uncured silicone resin coating. This can be done in any desired manner, for example, with reference to the drawings, the carboxylic acid can be applied in selected areas by means of a suitable backing medium, such as paper or other flexible materials, and the backing medium then pressed against the surface of the uncured silicone resin.

Figure 2:
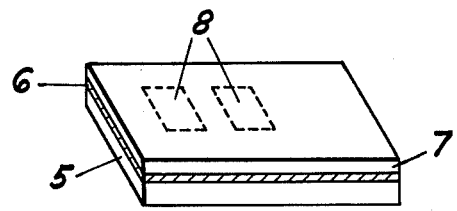
Figure 3:
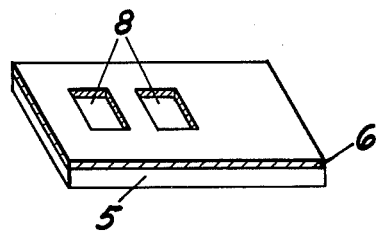

FIG. 1 is an elevation showing the application of such a backing material to a silicone resin coated article. FIG. 2 is a view of the same article with the backing material pressed against the entire surface of the uncured resin. FIG. 3 shows a view of the article after curing the silicone resin, removing the backing material and dissolving the uncured resin with alcohol.

More particularly the use of a backing material is illustrated by FIGURES 1, 2 and 3 as follows:

The base member 5 is coated with a silicone resin coating 6. A non-volatile carboxylic acid coating is applied to portions of a flexible material 7 in selected areas 8. The flexible backing is then placed against the surface of a silicone resin as shown in FIG. 2 and the assembly is then heated to cure the silicone resin. The backing material 7 is then stripped from the surface of the cured silicone resin 6, and the entire surface is washed with an alcohol solvent whereupon that portion of the silicone resin corresponding to areas 8 is dissolved away leaving exposed the surface of base member 5.

Figure 4:
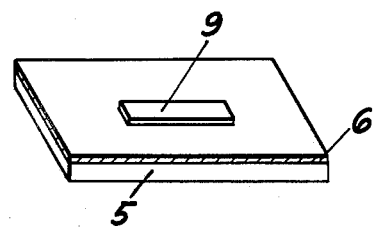

Alternatively one may apply the carboxylic acid to a flexible backing and cut the backing into the desired shape so that it covers only a portion of the silicone resin surface. Instead of using a backing one may also apply the carboxylic acid directly to a portion of a silicone resin coating. Both of these processes are illustrated in FIG. 4 in which 9 represents the carboxylic acid coating with or without a flexible backing. In this case the assembly is cured as above and if a flexible backing 9 is employed, it is then stripped from the surface and the surface is washed with alcohol. This will remove uncured silicone resin corresponding to area 9 together with any carboxylic acid adhering to the uncured resin.

It should be understood, of course, that it is not essential that a flexible backing be used as the means for applying the carboxylic acid to the silicone resin surface. Alternatively the resin can be feasibly applied in a form of a viscous paste having the consistency of printing ink. The latter method is particularly desirable when the surface to be left uncoated is irregular. In such cases one may simply paint a viscous solution of the carboxylic acid on the irregular portions of the surface. For example, in case it was desired to coat all of the surface of an electronic article except certain protrusions, one could coat the entire surface of the electronic device with the silicone resin and then apply the carboxylic acid to the protrusions only.

For the purpose of this invention any type of base member can be employed. This includes, for example, metal, ceramic, or organic plastic base members.

Any organosiloxane resin containing an average of from 1 to 1.7 monovalent hydrocarbon radicals per silicon can be employed in this invention. Such resins are commercially available materials. Preferably the hydrocarbon radicals should contain less than 19 carbon atoms. Specific examples of such organopolysiloxanes are those which are polymers or copolymers of units of the formulae $RSiO_{3/2}$, $R_2SiO$, $R_3SiO_{.5}$ and $SiO_2$. The various units must be present in such proportion that the ratio of hydrocarbon substituents to silicon is within the above range.

For the purpose of this invention the monovalent hydrocarbon radicals R can be any alkyl radical such as methyl, ethyl, isobutyl, amyl or octadecyl; alkenyl radicals such as vinyl, allyl, hexenyl and methallyl; cycloaliphatic radicals such as cyclopentyl, cyclohexyl, cyclohexenyl and methylcyclohexenyl; aromatic hydrocarbon radicals such as phenyl, xenyl, tolyl, or naphthyl; aralkyl hydrocarbon radicals such as benzyl, β-phenylethyl, β-(paravinylphenyl)-ethyl and gamma-propylphenyl.

For the purpose of this invention it is essential that the catalyst for curing the organosiloxane resin be a quaternary ammonium compound of the above-defined types. If the catalyst is a carboxylic acid salt of a quaternary ammonium hydroxide, it is immaterial whether one adds the salt to the resin per se or whether one forms the salt in situ by first adding a quaternary ammonium hydroxide or alkoxide to the resin and then neutralizes them with a carboxylic acid.

The amount of quaternary ammonium compound is not critical, but it is only necessary to add that amount which will adequately cure the silicone resin not in contact with the carboxylic acid coating.

The quaternary catalysts employed herein are of the formulae $R_4NOOCR'$, $R_4NOH$ and $R_4NOR''$. For the purpose of this invention R can be any monovalent hydrocarbon radical such as alkyl radicals such as methyl, ethyl and octadecyl; alkenyl radicals such as vinyl, allyl and hexenyl; cycloaliphatic radicals such as cyclohexyl and cyclohexenyl; aryl hydrocarbon radicals such as phenyl, tolyl and xenyl; aralkyl hydrocarbon radicals such as benzyl and any hydroxylated hydrocarbon radicals such as hydroxyethyl, hydroxypropyl or hydroxyhexenyl.

R' can be any monovalent hydrocarbon radical such as alkyl radicals such as methyl, ethyl and octadecyl; any alkenyl radicals such as vinyl, allyl and hexenyl; any cycloaliphatic hydrocarbon radicals such as cyclohexyl and cyclohexenyl; any aromatic hydrocarbon radical such as phenyl, tolyl or xenyl, and any aralkyl hydrocarbon radical such as benzyl.

R'' can be any alkyl radical such as methyl, ethyl, isopropyl, 2-ethylhexyl, t-butyl and octadecyl. For the purpose of this invention the various radicals in the quaternary ammonium compound can be the same or different.

It should be understood that in selecting the amount and type of quaternary ammonium compound to be used with any particular siloxane, the quaternary compound selected should be compatible with the silicone resin. Compatibility can be improved by employing a mutual solvent. The amount of quaternary ammonium catalyst based on the weight of the silicone resin will also vary depending upon the size of the organic groups attached to the nitrogen. Thus where R and R' are large more of the quaternary ammonium compound based on the weight of the silicone resin will be required than when these groups are small.

In those cases where the quaternary hydroxides and alkoxides are employed, the siloxane resin should be coated on the surface of the base member and cured within 24 hours after addition of the catalyst. When the quaternary salts are used the shelf life of the catalyzed resin is infinite.

After the surface is coated with the siloxane, it is generally preferable to allow any solvent present to evaporate prior to application of the carboxylic acid coating. This drying may take place at room temperature or at some temperature below the activation temperature of the resin catalyst.

For the purpose of this invention any non-volatile carboxylic acid can be employed. The term "non-volatile" as employed herein means that the acid will not diffuse into areas which it is desired to remain coated. Thus, the resin must not only be non-volatile at room temperature, but also at temperatures necessary to cure the silicone resin. In general, the carboxylic acids employed herein will have boiling points above 200° C. although this temperature is not critical.

The carboxylic acid employed herein can be of two general types: (1) is a polymeric material such as a polyester or polyamide which contains free carboxylic groups. The other is a monomeric carboxylic acid which can contain one or more carboxyl groups.

The carboxylic acid can be applied to the silicone resin coating per se or it can be admixed with a material which will render the carboxylic acid of proper coating consistency. In any event, in what ever form the carboxylic acid is applied, the carboxylic acid coating should have an acid number of at least 1. Any such coating containing a non-volatile carboxylic acid in any form is operative herein. Thus the carboxylic acid may be admixed with fluid materials to produce a material of a proper coating consistency or the carboxylic acid may be painted on a flexible backing material, or if the acid is resinous in nature it may be applied directly to the siloxane resin.

Specific examples of acids which are operative herein are non-volatile aliphatic acids such as octanoic, stearic, lauric or oleic; aromatic carboxylic acids such as terephthalic, tolane dicarboxylic and isophthalic; monoesters of dicarboxylic acids such as monomethyl terephthalate, monobutyl adipate and monoethyl isophthalate; or polymeric materials such as glycerol terephthalate, alkylene glycol terephthalates, the amide of hexamethylenediamine and adipic acid and trimethylolpropane terephthalates. It should also be understood that the acids employed herein can be substituted with other groups such as halogen, nitro, nitryl, hydroxyl, amide or any other non-acidic functional group.

Suitable flexible backings which may be employed with the acid coating include such materials as paper, cellulose, organic plastics, siloxane rubbers, or metal foils.

After the acid coating has been applied to the silicone resin and the assembly cured by heating at a temperature sufficient to cure the siloxane resin, the acid coating is then removed and the uncured portion of the silicone resin is washed away from the surface of the base member with an alcohol solvent. An alcohol solvent is essential for the purpose of this invention because it will dissolve uncured silicone resin, but will not affect the cured resin. Other types of solvents will affect the cured resin, and hence are not suitable. It is also desirable that any carboxylic acid remaining on the surface of the uncured resin should also be soluble in alcohol although this is not essential since the carboxylic acid coating can be removed by other means such as stripping from the assembly or otherwise.

Any aliphatic alcohol or cycloaliphatic alcohol is suitable for the purpose of this invention. These include monohydroxy alcohols such as methanol, ethanol, butanol, tert-butanol, isopropanol, hexanol, octanol, cyclohexanol, cyclopentanol and polyhydroxy alcohols such as ethylene glycol, propylene glycol, polyethylene glycol, glycerine, trimethylolpropane and trimethylol ethane.

If desired, the alcohol may also contain other functional groups such as ether linkages or ester linkages. Thus one can employ alcohols such as the monomethylether of ethylene glycol, the monomethylether of propylene glycol, the monoethylether of polyethylene glycol, the monomethylether of glycerine, the dimethylether of glycerine or ethylene glycol monoacetate.

The process of this invention is particularly adaptable for making printed circuits. In this case a suitable base member is coated with copper foil and the entire surface of the copper is then coated with an uncured silicone resin. The outline of the circuit is then made by printing the carboxylic acid coating on the silicone resin, curing the assembly and then washing away the uncured silicone resin with alcohol. This will expose that portion of the copper surface which was coextensive with the acid coating while leaving the remainder of the copper surface coated with the silicone resin. The exposed copper can then be treated with standard HCl-ferric chloride etching solution. The cured silicone resin will perfectly protect that portion of the copper underneath it, thereby leaving an outline of the desired circuit. The cured resin can be readily removed from the circuit by washing with toluene and the circuit is then ready for the proper electrical connections.

The term "acid number" has reference to the milligrams of KOH required to neutralize one gram of the acid coating.

The following examples are illustrative only and should not be construed as limiting the invention which is properly delineated in the appended claims.

*Example 1*

Ten mil aluminum foil was coated by dipping the foil into a 55% by weight xylene solution of a methylphenylpolysiloxane resin having a total of 1.45 methyl and phenyl groups per silicon and having a phenyl to methyl ratio of 1.13. The resin contained 1.25% by weight silicon-bonded hydroxyl groups and .15% by weight benzyl trimethyl ammonium acetate based on the weight of the silicone resin. The solvent was evaporated at room temperature.

Pieces of heavy paper were dipped into the solutions of the various acids shown below. In each case the solvent was evaporated and each of the pieces was cut into the desired pattern and each pattern was pressed into the surface of the silicone resin film on the aluminum foil. Each assembly was then heated in an air circulating oven at 150° C. for 15 to 30 minutes.

The paper patterns were then removed while the resin was still hot and the coated foils were then washed with methyl Cellosolve (monomethylether of ethylene glycol). In each case the uncured resin which was under the paper patterns during cure was washed away leaving a clean aluminum surface while the cured resin was undisturbed. The edges between the coated and uncoated portions of the aluminum foil were sharp and well defined.

by weight silicon-bonded OH and .15% by weight benzyltrimethyl ammonium acetate based on the weight of the copolymer.

The coated laminate was then allowed to dry at room temperature to remove the solvent.

A trimethylolethane isophthalate ester having an acid number of 16 was dissolved in a mixture of butyl acetate and ethanol to give a 50% by weight solution of the ester. This solution was applied to various areas of the uncured silicone resin coating on the copper surface. The butyl acetate-ethanol solvent was allowed to evaporate at room temperature and the assembly was then cured 20 minutes at 150° C. The laminate was washed with methyl Cellosolve. This removed the ester coating and that portion of the uncured silicone resin beneath the ester coating. This left a sharply defined pattern corresponding to the areas covered by the acid ester. The exposed copper surface was then etched away with a standard ferric chloride-HCl solution. The copper underneath the surface of the cured siloxane resin was unaffected by the etching solution.

The cured siloxane resin is then removed from the copper by washing with toluene which exposes a clean copper surface which is ready for fabrication of electronic devices.

*Example 3*

A section of copper coated silicone resin-glass laminate was dipped into the silicone resin catalyst combination of Example 1.

Acid 6 of Example 1 was dissolved in a polyethylene glycol having a molecular weight of 300 to give a 50% by weight solution of the acid. The acid solution was thickened to printing paste consistency with a fume silica to give a cone penetrometer of 335. This paste was spread on selected areas of the uncured silicone resin coating and the assembly was heated 15 minutes at 150° C. The laminate was then washed with methyl Cellosolve to remove the acid paste and the uncured silicone resin thereunder. The exposed copper surface was then removed with standard etching solution. The copper under the cured silicone resin was unaffected by the etching solution.

*Example 4*

Equivalent results were obtained when butanol was employed in the place of methyl Cellosolve to remove the uncured silicone resin in any of the above examples.

*Example 5*

Equivalent results were obtained when beta-hydroxyethyltrimethyl ammonium 2-ethylhexoate was substituted

|   | Acid | Acid No. | Solvent for acid | Concentration of acid solution in percent by wt. |
|---|---|---|---|---|
| 1 | 2-ethylhexoic acid | 35.4 | Toluene | 50 |
| 2 | Trimellitic anhydride-glycerine polyester | 1.21 | Glycol diacetate and isopropyl alcohol | 57.9 |
| 3 | do | 16.2 | do | 30 |
| 4 | Coconut oil modified glycerol terephthalate | 6 | Xylene | 30 |
| 5 | Trimethylolethane isophthalate | 60 | Ethanol and methyl Cellosolve | 30 |
| 6 | [HO⟨⟩C(CH₃)(CH₃)⟨⟩OC₂H₄]₂O | 175 | Acetone | 25 |

*Example 2*

A commercial copper coated epoxide resin-glass laminate was dipped into a 50% toluene solution of a copolymer of 75 mol percent monoethylsiloxane and 25 mol percent mono(2-phenylpropyl)siloxane containing 1.25% for the benzyl trimethyl ammonium acetate in the above examples.

*Example 6*

Equivalent results are obtained when the following siloxanes are employed in the above procedure.

(1) Copolymer of 50 mol percent monomethylsiloxane and 50 mol percent dimethylsiloxane.
(2) Copolymer of 10 mol percent monovinylsiloxane, 50 mol percent phenylvinylsiloxane and 40 mol percent monophenylsiloxane.
(3) Copolymer of 5 mol percent monooctadecylsiloxane, 30 mol percent monomethylsiloxane, 10 mol percent monophenylsiloxane, 10 mol percent diphenylsiloxane and 45 mol percent monopropylsiloxane.

*Example 7*

Equivalent results are obtained when tetramethylammonium 2-ethylhexoxide, tetrabutylammonium hydroxide, benzyltrimethylammonium ethoxide, hydroxyethyltrimethylammonium butoxide and octadecyltrimethylammonium hydroxide are employed in the procedure of Example 1. In each case the silicone resin is employed within 12 hours after addition of the catalyst.

That which is claimed is:

1. A method of selectively coating a solid surface with an organopolysiloxane resin which comprises (1) applying a coating of uncured siloxane resin to said surface, (2) placing a coating having an acid number of at least 1 and consisting essentially of a non-volatile carboxylic acid, against that portion of the siloxane resin coating which it is desired to remove from said surface, (3) heating the coated surface at a temperature below the decomposition temperature of the carboxylic acid to cure that portion of the siloxane resin coating not in contact with the acid coating and (4) removing the uncured siloxane resin and any adhering carboxylic acid coating from said surface with an alcohol solvent whereby the cured silicone coating remains on the desired parts of said surface, said siloxane resin consisting essentially of a monovalent hydrocarbon substituted polysiloxane in which there is an average of from 1 to 1.7 monovalent hydrocarbon groups per silicon, said siloxane containing a curing catalyst selected from the group consisting of quaternary ammonium salt of carboxylic acids, quaternary ammonium hydroxides and quaternary ammonium alkoxides.

2. A method in accordance with claim 1 in which the organopolysiloxane is a methylphenylpolysiloxane resin containing as a catalyst a quaternary ammonium salt of a carboxylic acid.

No references cited.